United States Patent [19]
Jackson et al.

[11] 3,808,370
[45] Apr. 30, 1974

[54] SYSTEM USING ADAPTIVE FILTER FOR DETERMINING CHARACTERISTICS OF AN INPUT

[75] Inventors: Leland B. Jackson, Monsey; John Bertrand, Garnerville, both of N.Y.

[73] Assignee: Rockland Systems Corporation, West Nyack, N.Y.

[22] Filed: Aug. 9, 1972

[21] Appl. No.: 279,064

[52] U.S. Cl. .............................................. 179/1 SA
[51] Int. Cl. ............................................. G10l 1/02
[58] Field of Search.... 179/1 SA, 15.55 R, 15.55 T, 179/1 SB, 1 VS; 340/148

[56] References Cited

UNITED STATES PATENTS

| | | | |
|---|---|---|---|
| 3,437,757 | 4/1969 | Coker | 179/15.55 R |
| 3,439,122 | 4/1969 | Coker | 179/15.55 R |
| 3,327,057 | 6/1967 | Coker | 179/1 SA |
| 3,190,960 | 6/1965 | Lawrence | 179/1 SA |
| 3,078,345 | 2/1963 | Campanella | 179/15.55 R |

FOREIGN PATENTS OR APPLICATIONS

| | | | |
|---|---|---|---|
| 2,019,280 | 11/1970 | Germany | 179/1 SA |

*Primary Examiner*—Kathleen H. Claffy
*Assistant Examiner*—Jon Bradford Leaheey
*Attorney, Agent, or Firm*—Flynn & Frishauf

[57] ABSTRACT

An adaptive filter system for determining characteristics of an electrical input signal, such as resonant frequencies, anti-resonant frequencies, etc. which includes a plurality of anti-resonance circuits and/or resonance circuits coupled to an input signal, means for developing indicator signals indicate the deviation of the anti-resonant and/or resonant frequencies of the circuits from the anti-resonant and/or resonant frequencies of the input signal, and means for cross-correlating the output from at least one of the circuits with the indicator signals, and for generating correction signals as a function of the cross-correlation. The correction signals are fed to the circuits to vary the anti-resonant and/or resonant frequencies thereof so that the frequencies correspond to the respective resonant and/or anti-resonant frequencies in the input signal.

36 Claims, 11 Drawing Figures

SYSTEM USING ADAPTIVE FILTER FOR DETERMINING CHARACTERISTICS OF AN INPUT

The present invention relates to an adaptive filter system for determining desired characteristics of an input, and more particularly, to a system for determining or eliminating resonant and/or anti-resonant responses contained in an input.

The system of the present invention is useful in voice analysis systems for determining formant frequencies, pitch and voicing information, and anti-resonance frequencies of an input voice signal. The present invention is also useful in vibration analysis systems wherein it is desired to determine resonances and/or anti-resonances of a vibrating system. The present invention is capable of determining such vibration information without the use of complex equipment, such as spectrum analyzers, or the like. The present invention is useful in many other areas. For example, when used with an electrocardiograph, the present invention renders the output signal more "readable," especially by an unskilled operator, and thereby renders the electrocardiogram equipment more reliable.

While the present invention is suitable for many applications, the detailed description given herein will be with respect to a voice analysis system. It should be clear that the particular detailed description is not limiting of the claimed inventive concept.

In voice analysis systems, it is quite important to determine not only the location of formant frequencies, but also pitch and voicing information and information regarding anti-resonances. Many prior art systems exist for determining such characteristics of the input signal, but they are rather complex and do not always reliably provide the desired information. Such prior art systems are exemplified, for example, by U.S. Pat. No. 2,635,146, and by U.S. Pat. No. 3,190,963.

In some prior art systems use is made of digital filtering equipment for determining formant frequency information. However, it is generally necessary to utilize several banks of band pass filters, thus increasing the complexity and cost of the apparatus. Moreover, with the prior art systems, complex processing is still required to determine whether the speech is voiced or unvoiced and, if voiced, to determine the pitch frequency.

The main object of the present invention is to provide a simplified system using adaptive filters for not only detecting formant frequency information in speech, but for also determining pitch and/or anti-resonance information. Still further, the object of the present invention is to provide such a system which is simpler and less complex than the prior art systems.

Another objective of the present invention is to provide an adaptive filter system for determining frequency characteristics of input signals, such as in voice system, vibration systems, electrocardiogram systems or the like.

SUMMARY OF THE INVENTION

In accordance with an aspect of the present invention, apparatus for determining characteristics of an electrical input signal comprises a source of an input signal, at least two anti-resonance circuits coupled to the input source, means for developing indicator signals to indicate the deviation of the anti-resonant frequencies of the anti-resonance circuits from the resonant frequencies in the input signal, and means for cross-correlating the output from at least one of the anti-resonance circuits with the indicator signals and for generating correction signals as a function of the cross-correlations, the correction signals selectively varying the anti-resonant frequencies of the anti-resonance circuits such that the anti-resonant frequencies of the anti-resonance circuits correspond to respective resonant frequencies in the input signal. In accordance with a feature of the present invention, the anti-resonance circuits are connected in series with the input signal source. A plurality of additional anti-resonance circuits, the anti-resonant frequencies of which are also controlled by the correction signals, may be used for developing the indicator signals. In an alternate embodiment the indicator signals may be developed by a plurality of parallel connected resonance circuits, the parallel connected resonance circuits being connected to the output of the last of the series connected anti-resonance circuits.

In accordance with a further aspect of the present invention, anti-resonance frequencies in the input signal can be detected by replacing the anti-resonance circuits by appropriate resonance circuits or by adding resonance circuits to the previously described configuration. As in the above arrangement, cross-correlation techniques are used to develop correction signals for setting the resonance circuits to the frequencies of the anti-resonant frequencies contained in the input signal.

DETAILED DESCRIPTION OF PREFERRED EMBODIMENT

Figures 1, 6:
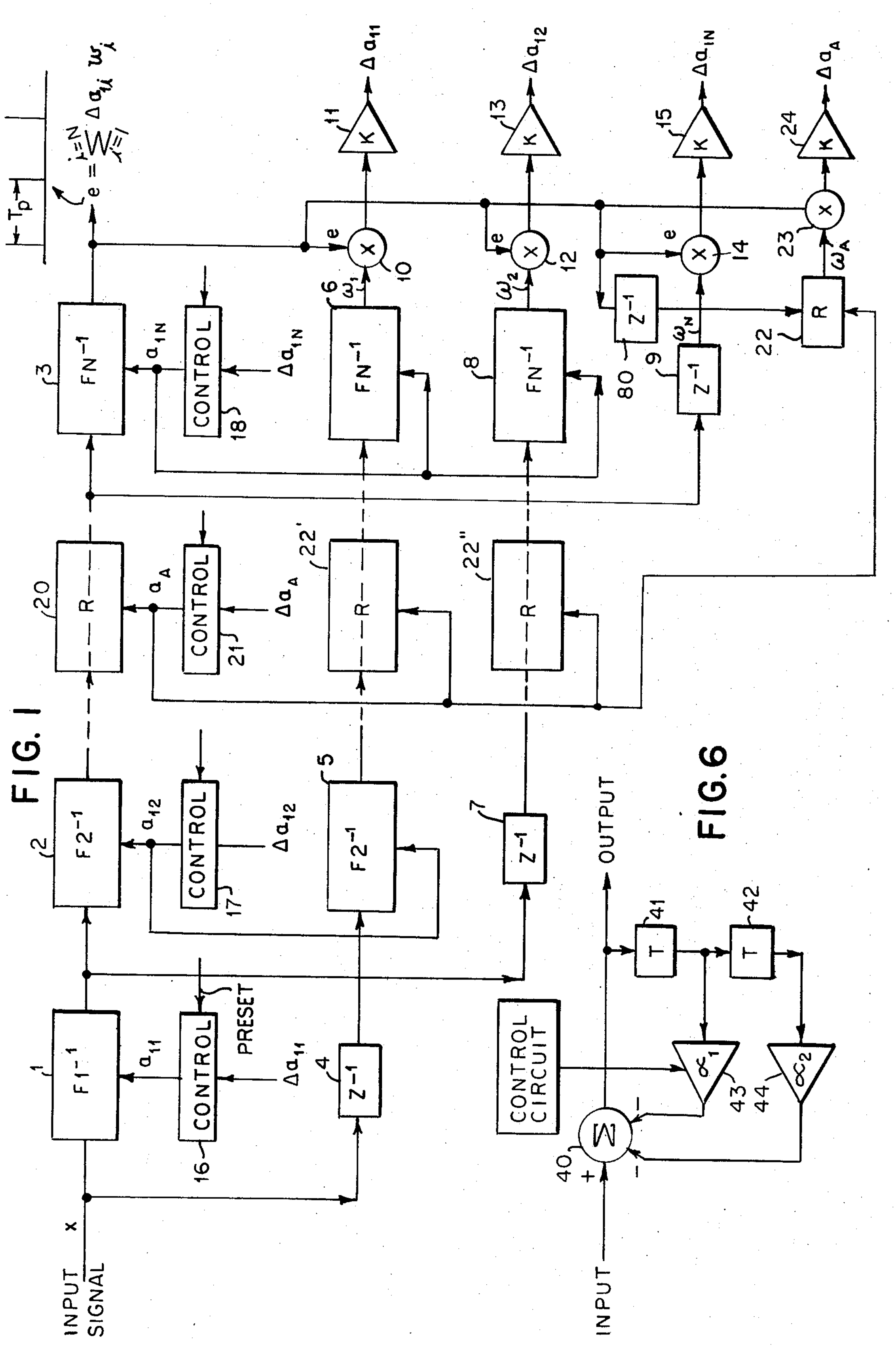
FIG. 1 is a block diagram of a voice analysis system using the basic techniques of the present invention.
FIG. 6 is a schematic block diagram of a resonance circuit for use in the present invention.

Referring to FIG. 1, there is shown a block diagram of a basic adaptive inverse filter arrangement illustrating the basic concepts of the present invention. The embodiment of FIG. 1 is for all pole analysis (that is, for resonant frequency analysis). The system may also be adapted for zero analysis (anti-resonant frequency analysis), as will be discussed hereinbelow. The arrangement of FIG. 1 is described with respect to a voice system only by way of example. The object of the FIG. 1 configuration is to detect formant frequencies F1, F2....FN and to also detect pitch and voiced/unvoiced information of the voice input signal. The system will be described in terms of a digital filter embodiment but other embodiments are possible.

The voice input signal $x$ is fed into anti-resonance circuit 1, the output of which is fed to series connected anti-resonance circuits 2 and 3, and then to an output terminal. The output signal is denoted $e$. The input signal $x$ is also fed to a delaying circuit 4, the output of which is fed to the series connected anti-resonance circuits 5 and 6, anti-resonance circuits 5 and 6 being identical to anti-resonance circuits 2 and 3, respectively. The output of anti-resonance circuit 1 is fed to delaying circuit 7, the output of which is fed to anti-resonance circuit 8. Anti-resonance circuit 8 is identical to anti-resonance circuits 3 and 6. The output of anti-resonance circuit 2 is fed to delaying circuit 9. Additional anti-resonance circuits may be coupled between circuits 2 and 3, and additional branch circuits branched therefrom may be added, as necessary, using the same technique illustrated in FIG. 1. The output $\omega_1$ of anti-resonance circuit 6 is fed to a multiplier circuit 10, which also receives the output signal $e$. The output of multiplier 10 is fed to an amplifier 11 to develop an correction signal $\Delta a_{11}$. The output $\omega_2$ of anti-resonance circuit 8 is fed to a multiplier 12, which also receives the signal e as an input. The output of multiplier 12 is fed to amplifier 13, to develop the correction signal output $\Delta a_{12}$. The output $\omega_N$ of delaying circuit 9 is fed to a multiplier 14, which also receives the signal e as an input. The output of multiplier 14 is fed to an amplifier 15 to develop the correction signal $\Delta a_{1N}$.

Each of the anti-resonance circuits 1, 2 and 3 have control circuits 16, 17 and 18 respectively connected to their inputs, for controlling the anti-resonance frequency of circuits 1, 2 and 3. The control circuits receive as inputs the correction signals $\Delta a$ and also may receive a pre-setting input signal to pre-set the anti-resonance frequency of the circuits to a predetermined value in a given range. Anti-resonance circuits 5, 6 and 8 are similarly controlled. A detailed illustration of a typical digital filter-type anti-resonance circuit for use in the embodiment of FIG. 1 is illustrated in FIG. 2, and will be described hereinbelow. Other anti-resonance circuit arrangements could clearly be used. The delaying circuits 4, 7, 9 and 80 delay their respective input signals by one sampling period of the digital signals.

When using the circuit of FIG. 1 in a voice analysis system, the object is to reduce the input signal to an output signal $e$ which represents the driving function of the voice. The signal $e$, as illustrated in FIG. 1, represents the driving function for voiced sounds. The driving function for unvoiced sounds is effectively white noise. The impulses in the $e$ signal represent glottal impulses in the speaker's voice and the spacing T between the impulses represents pitch information of the voice being analyzed. The final anti-resonant frequencies of the anti-resonance circuits 1, 2 and 3 indicate the values of the respective formant frequencies detected by the individual anti-resonance circuits. The anti-resonant frequency of each of the anti-resonance circuits is determined by the control signal fed thereto by the control circuits 16, 17 and 18. The input signal $x$ contains various resonant frequencies, and in accordance with the present invention, it is desired to decompose the voice input signal into its basic components, which component parameters can then be transmitted, and then reconstituted into a speech signal at the receiving end. The number of anti-resonance circuits $F1^{-1}$ — $FN^{-1}$ is determined by the number of formant frequencies which exist in the input, or the number of formant frequencies which are desired to be determined. In the case of band limited speech, six or more formants may be present even though only three formant parameters are generally to be transmitted.

In operation of the system of FIG. 1, if each of the anti-resonance circuits $F1^{-1}$ — $FN^{-1}$ are set at the proper frequency so as to correspond to each individual formant frequency, the output $e$ will appear as illustrated in the waveform thereof in FIG. 1 for voiced sounds, and will be white noise for unvoiced sounds. If, however, one or more of the anti-resonance circuits are not set at the appropriate formant frequency, the cross-correlation of the output signal e with the corresponding signals $\omega_1$ — $\omega_N$ will be non-zero, and non-zero correction signals $\Delta a$ are developed for the corresponding anti-resonant circuits. In the cross-correlation, the contribution of each signal $\omega_i$ will only be effective for its respective term in the signal $e$ since this term is squared in the cross-correlation. The remaining terms, being uncorrelated, will tend to cancel out on the average. Thus, erroneous contributions from other terms in the signal e when cross-correlated with respective indicator signals $\omega_i$ are effectively cancelled out. In the embodiment of FIG. 1, the signal $\omega_1$ indicates the contribution to the signal $e$ due to a diviation of the estimated first formant frequency. When the anti-resonance circuit 1 is finally adjusted by means of the correction signal $\Delta a_{11}$ to the proper frequency whereby the anti-resonance circuit 1 "cancels out" the first formant frequency, the term in the equation representing the output signal e corresponding to the first formant frequency will become zero. Thus, in the cross-correlation at multiplier 10, the contribution of $\omega_1$ when multiplied with the signal $e$ will effectively be zero. The multiplication of the $\omega_1$ term with the other terms in the signal e will average out to zero and will thus not cause erroneous feedback of correction signals to the anti-resonance circuit 1. The same technique is used for the other anti-resonance circuits. After a given period of time, due to the feedback of the correction signals $\Delta a$ to the control circuits 16–18 of the anti-resonance circuits, the anti-resonance circuits are automatically adjusted so as to be anti-resonant at the frequencies of the corresponding formants, thereby eliminating the responses in the output signal $e$ due to those formants. The result is a signal with effectively only spikes or noise corresponding to the voiced or unvoiced excitation, respectively, of the voice, or of the vocal tract. In the case of voiced excitation, the period between the spikes corresponds to the pitch period.

In the anti-resonance circuits, the control signals effectively move the zeros of the anti-resonance zero pair of the circuit, thereby varying the anti-resonant frequency thereof. This enables detection of the poles of the input signal.

In order to detect a zero of the input signal (that is an anti-resonance) which corresponds to a nasal or fricative type of sound in voice, for example, all that is necessary is to add a resonance circuit 20 in series with the series-connected anti-resonance circuits 1, 2 and 3 of FIG. 1. The resonance circuit 20 has a control circuit 21 which is similar to the control circuits 16–18, which receives a correction signal $\Delta a_A$. In the arrangement of FIG. 1, the output of the anti-resonance circuit 3 is fed to the delaying circuit 80, the output of which is branched off to another resonance circuit 22 which is identical to resonance circuit 20. Also resonance circuits 22′ and 22″ are coupled in series with the other branch paths. The output $\omega_A$ of resonance circuit 22 is fed to a multiplier 23 to cross-correlate the indicator signal $\omega_A$ with the signal $e$. The output of multiplier 23 is fed to an amplifier 24 to develop the signal $\Delta a_A$, which is fed to the controller 21 for resonance circuits 20, 22, 22′, and 22″ to adjust the resonance frequencies thereof, all of the resonance circuits being similarly controlled to be resonant at the same frequency. The cross-correlation technique discussed above with respect to the anti-resonance circuits is the same for the resonance circuits. The final resonant frequency of the resonance circuits, due to the feedback technique, represents an anti-resonant frequency in the input voice signal.

The underlying concept of the above-described embodiment is as follows. The signal $\omega_i$ corresponding to a given anti-resonance circuit corresponds to filtering the input signal $x$ through another path containing all series connected sections except that given anti-resonance circuit, whereas for signals $\omega_A$ corresponding to a given resonance circuit, $\omega_A$ is developed by passing the input through all of the series connected sections and through an additional resonance circuit R which corresponds to the given resonance circuit.

Figure 2A:
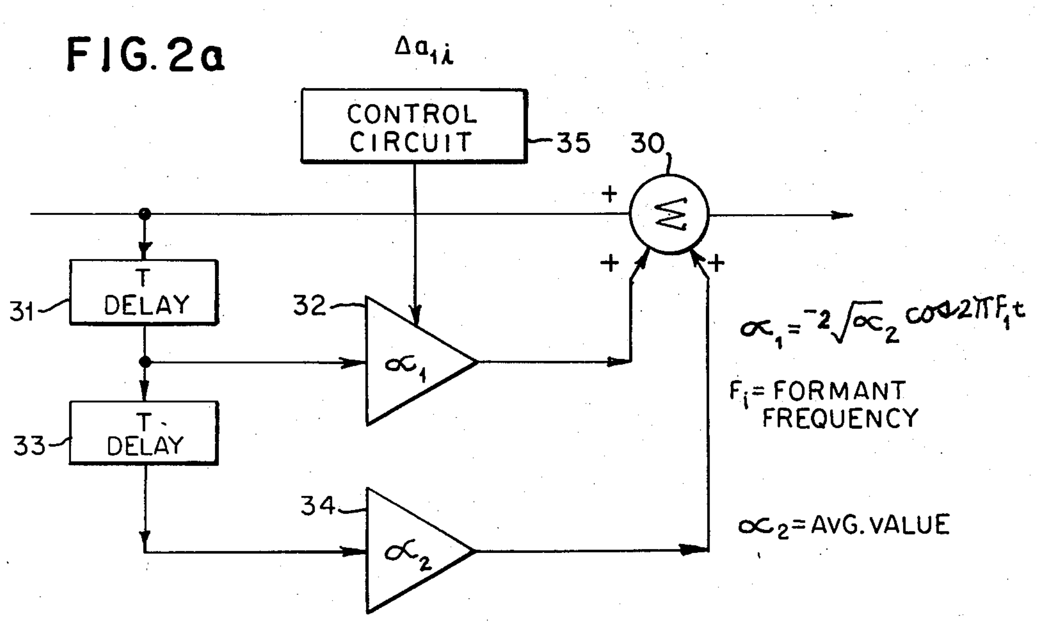
FIG. 2*a* is a schematic block diagram of an anti-resonance circuit for use in the circuit of FIG. 1.
Figure 2B:
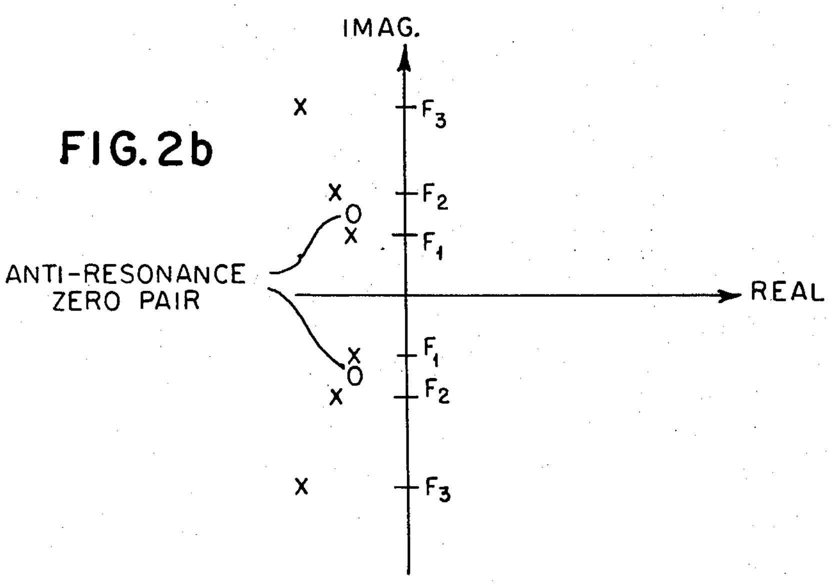
FIG. 2*b* is a pole-zero graph of the effect of varying the amplification factor of the anti-resonance circuit.

A typical digital-filter type anti-resonance circuit for use in the present invention is a zero-pair circuit such as shown in FIG. 2*a*. The anti-resonant frequency of this circuit is variable by means of varying the amplification factor $\alpha_1$.

Referring particularly to FIG. 2*a*, the anti-resonance circuit includes a time delay 31 coupled to the input line and an amplifier 32 having a variable amplification factor $\alpha_1$ coupled to the output of the time delay 31. Also coupled to the output of time delay 31 is a second time delay 33, the output of which is fed to an amplifier 34 having an amplification factor $\alpha_2$. $\alpha_2$ controls the bandwidth of the anti-resonance and may be variable or fixed, depending upon the application of the system. Also, $\alpha_2$ may be adaptive, as will be described below with reference to FIG. 10. The input signal and the outputs of the amplifiers 32 and 34 are fed to a summing device 30, the output of which constitutes the output of the anti-resonance circuit. A control circuit 35 is coupled to the amplifier 32 to vary its amplification factor $\alpha_1$. Varying the amplification factor $\alpha_1$ effectively varies the location of the zero-pair illustrated, for example, in FIG. 2*b*. This changes the anti-resonance frequency of the circuit.

The amplifiers 32 and 34 of FIG. 2*a* are digital amplifiers in the illustrated embodiment. A digital amplifier may comprise, for example, a multiplier having a fixed or variable coefficient. The input signal is multiplied by the coefficient to provide effective amplification. Varying the coefficient, varies the amplification factor $\alpha$ of the amplifier.

In a voice system, the resonance and anti-resonance circuits preferably have narrower bandwidth (i.e., a smaller $\alpha_2$) for the analysis of voiced sounds than for the analysis of unvoiced sounds. In a given configuration the $\alpha_2$'s may be set to an average value for voiced sounds, and when unvoiced sounds are detected, the $\alpha_2$'s may be varied to increase the bandwidth to enable more accurate determination of the formant frequencies. An additional bit of information can be generated to indicate voiced or unvoiced sounds, and used to reconstitute the sounds, as will be described below.

The control circuit 35 for the anti-resonance circuit of FIG. 2*a* may comprise, for example, an accumulator which receives the output of one of the amplifiers 11, 13 and 15 of FIG. 1. See FIG. 3. If such an accumulator is utilized, the accumulator may incorporate an additional input for pre-setting the accumulator to a given value which may be an approximation to the desired final anti-resonance frequency of the anti-resonance circuits. The output of the accumulator 36 may be used to control the anti-resonance frequency of the anti-resonance circuits. However, for better operation, the output of the accumulator 36 is fed to an optional processor 37, the construction of which is illustrated in FIG. 4.

Figures 3, 4, 7:
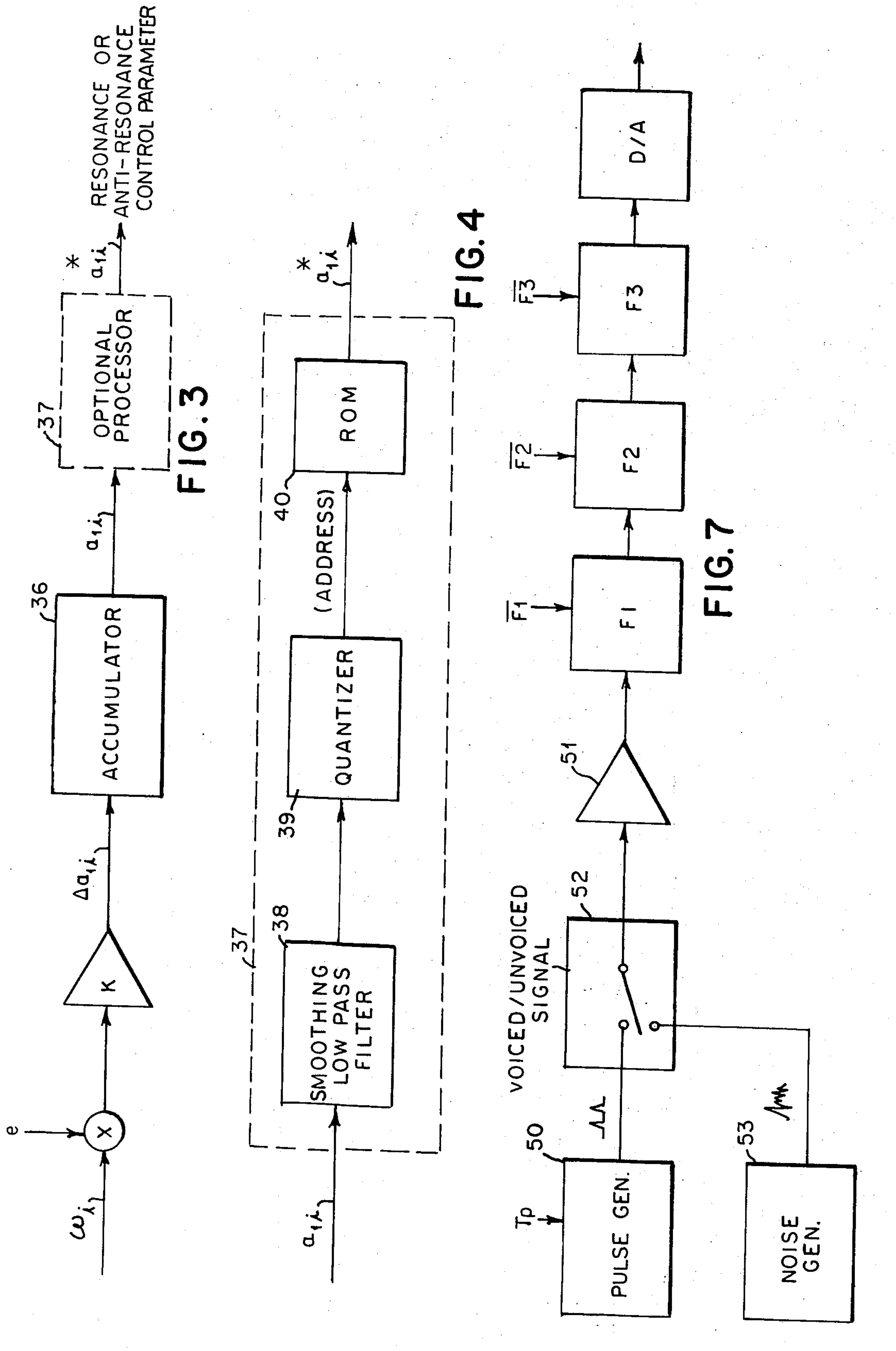
FIGS. 3 and 4 are schematic block diagrams of an input control circuit for the anti-resonance circuits of FIG. 1.
FIG. 7 is a block diagram of a speech synthesizer.

Referring to FIG. 4, the optional processor 37 includes a smoothing low pass digital filter 38 for receiving the output of the accumulator 36. The output of the low pass filter 38 is fed to a quantizer 39 which generates digital signals corresponding to the level of the input signal thereto. The output of the quantizer 39 is in the form of address signals which are fed to a read-only-memory (ROM) 40, which has control values stored in the various locations thereof which correspond to the addresses fed to the input of the ROM. The address signals to the ROM 40 correspond with the values stored in particular locations so as to develop the appropriate control values. The output of the ROM 40 is the control parameter for use in controlling the anti-resonance frequency of the anti-resonance circuits.

Instead of the arrangement of FIGS. 3 and 4, the correction signals at the output of the amplifiers 11, 13 and 15, for example, can be merely detected to determine the sign of the correction signal. Depending upon the sign of the error signal, a predetermined fixed amount of correction can be fed to the anti-resonance circuits to adjust the frequencies thereof. Depending upon the sign of the correction, the value of the incremental correction in frequency has a sign such that the correction brings the frequency in a direction to tend to bring the error signal to zero. Depending upon how far off-frequency the anti-resonance circuits originally were, a variable amount of time will be required to bring the error signal to zero, and therefore arrive at the proper frequency of anti-resonance.

When resonance circuits such as resonance circuits 20 of FIG. 1 are used, identical control systems as discussed above for the anti-resonance circuits are used for controlling the resonance frequency of the resonance circuits. A detailed description of such an embodiment is not given herein since the concepts are similar to the concepts described above.

Figure 9:
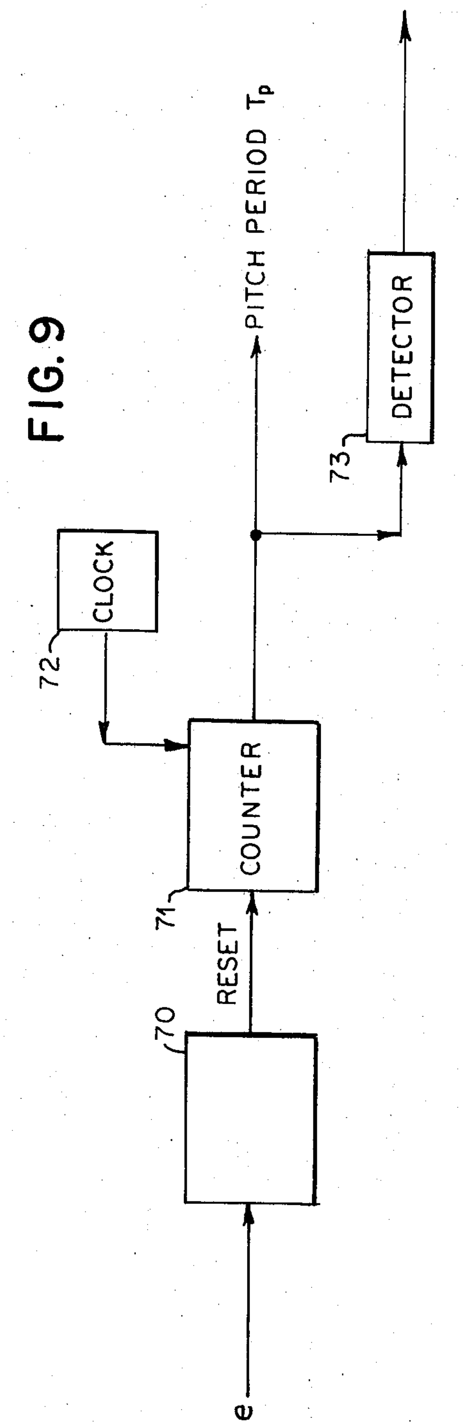
FIG. 9 is a block diagram of a typical arrangement of detecting the presence of voiced or unvoiced sounds in a speech system.

Referring to FIG. 9, there is shown a typical example of an arrangement for generating signals corresponding to the pitch period and for generating signals which indicate whether the speech is voiced or unvoiced. The output signal e from the circuit arrangement of FIG. 1, for example, is fed to an envelope detector 70, the output of which is fed to a free running counter 71 which is controlled by a clock 72. The envelope detector comprises, for example, in simplified form, a diode which is series connected with the input signal line and an RC circuit. Each time the input signal amplitude exceeds the previous charge on the capacitor of the RC circuit, the capacitor is charged, thereby developing pulses which are fed to the reset input of counter 71. Counter 71 is reset each time a pulse is applied to the reset input thereto, and thereby counts the time period between successive pulses from the envelope detector 70 to the counter.

The output from the counter 71 is a numerical value indicating the time period elapsing between adjacent pulses of the input signal $e$. The numerical values correspond to the pitch period and are coded (as known in the art) and transmitted along with the formant frequency information, as required. Also coupled to the output of the counter 71 is detector 73 which detects whether the pitch period from the counter is below a predetermined value. If the pitch period (i.e., the time between pulses of the signal $e$) is below the predetermined value, then the detector 73 generates a signal which indicates that the signal $e$ represents unvoiced speech. If the pitch period exceeds the predetermined value, then the detector 73 recognizes that the signal $e$ represents voiced speech and the appropriate signal is generated to represent this parameter.

For example, the pitch period is generally approximately 10 msec. If the detector detects that the pitch period is substantially less than 10 msec., then the detector 73 will generate a signal indicating that the signal e represents unvoiced speech. This corresponds to a condition where the signal $e$ is white noise and the pulses of the white noise signal trigger the counter 71 at a rate which is substantially higher than the rate of occurrence of the impulses in the case of voiced speech. As mentioned above, the output of the detector 73 is a signal which indicates whether or not the voice input signal to the system is voiced or unvoiced speech. As a practical matter, the determination of whether the speech is voiced or unvoiced will require at most only a few pitch periods. In a typical example, a delay of 10–20 msec. can be expected to enable determination as to whether the speech is voiced or unvoiced. This is a minor delay and will not adversely affect the operation of the overall system.

As mentioned hereinabove, the resonance and anti-resonance circuits of the present invention preferably have narrower bandwidths for the analysis of voiced sounds than for the analysis of unvoiced sounds. In a typical system, it is possible to utilize the output of the detector 73 to vary the bandwidths (that is, to vary the amplification factor $\alpha_2$) of the resonance and anti-resonance circuits so that detection of the formant frequencies for the voiced or unvoiced sounds can be made in a more accurate manner. When the bandwidths are set for detecting the formant frequencies of voiced sounds, and if the input sound is an unvoiced sound, it has been found that the circuitry will not accurately converge on the desired formant frequencies. At that point, when non-convergence is detected (by detecting the occurrence of white noise in the output signal $e$ by the arrangement of FIG. 9) the output from the detector 73 of FIG. 9 is fed to the resonance and anti-resonance circuits to vary the value of $\alpha_2$ to increase the bandwidth of the circuits. The circuitry would then more accurately converge toward white noise, which represents the input driving function for unvoiced sounds. Likewise, when the system is in the unvoiced mode, and the occurrence of voiced sounds is detected, the output of detector 73 can be used to again set the value of the $\alpha_2$ factors to a value suitable for detecting the formants of voiced sounds. An alternative arrangement is to utilize two separate and independent circuit configurations similar to FIG. 1, each circuit arrangement being fixedly set to operate with different bandwidths. Then, the circuitry of FIG. 9 is coupled to the output of the circuit configuration which is set to detect voiced sounds. When the detector 73 detects that unvoiced sounds are present at the input, as described above, the detector 73 causes selection of the output of the unvoiced circuit configuration in place of the output of the voiced circuit configuration. In this manner, the determination of the formant frequencies for voiced and unvoiced sounds is accurately accomplished.

Instead of having the values of the amplification factors $\alpha_2$ fixed, or only variable between two values, in accordance with a further feature of the invention, the values of $\alpha_2$ are made to be adaptive. That is, the valves of $\alpha_2$ are varied in accordance with the characteristics of the input signal being operated on, thereby "adapting" the values of $\alpha_2$ to the system requirements. For example, in a given system such as a speech system or a vibration testing system, if the bandwidth is not preknown, then it is not possible to pre-set the values of $\alpha_2$ of the resonance and/or anti-resonance circuits to an accurate value. In accordance with the arrangement illustrated in FIG. 10 of the drawings, the values of $\alpha_2$ of the various resonance and/or anti-resonance circuits can be adjusted in a manner similar to the manner in which the values of $\alpha_1$ of the resonance and/or anti-resonance circuits are varied.

Figure 10:
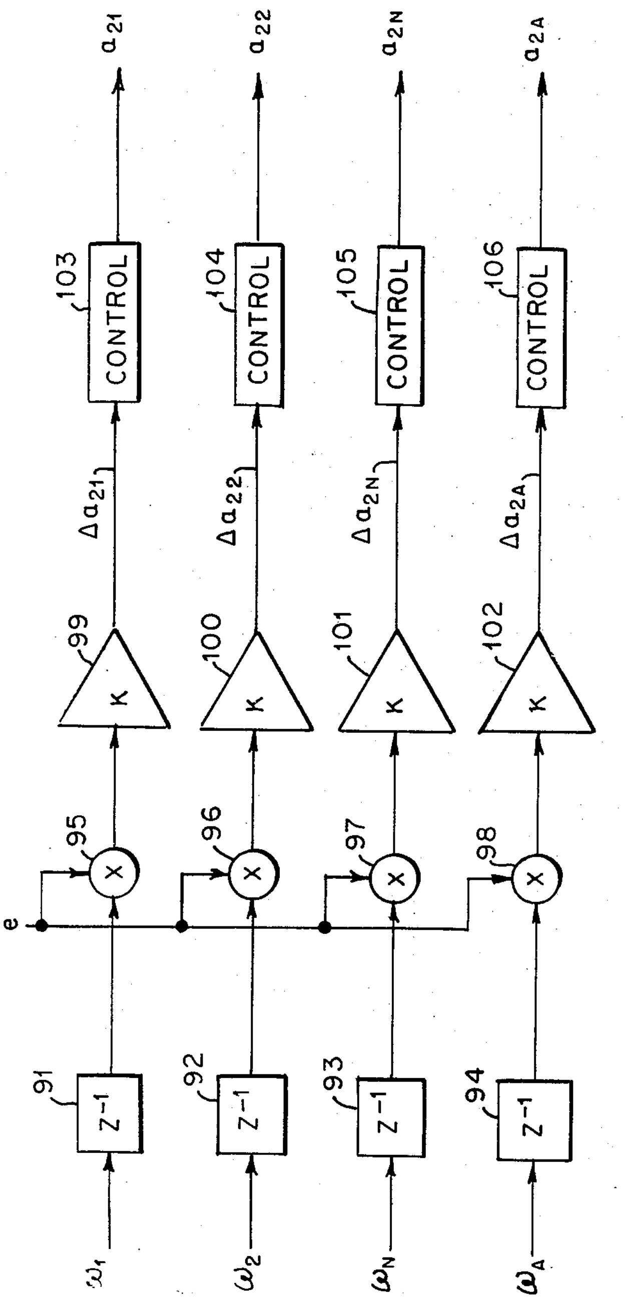
FIG. 10 is a block diagram illustrating further features of the present invention.

Referring to FIG. 10, the values of $\omega_1$, $\omega_2$, $\omega_N$, and $\omega_A$ from the circuit of FIG. 1, for example, are respectively fed to delaying circuits 91–94. The outputs of delaying circuits 91–94 are respectively fed to cross-correlating circuits 95–98, each of the cross-correlating circuits also receiving the output signal $e$ (for example from FIG. 1) as an input. Cross-correlators 95–98 are identical in construction to the cross-correlators 10, 12, 14 and 23 of FIG. 1. The outputs of cross-correlators 95–98 are respectively fed to amplifier circuits 99–102, to develop correction signals $\Delta a_{21}$, $\Delta a_{22}$, $\Delta a_{2N}$ and $\Delta a_{2A}$. The outputs of the amplifiers are then fed to control circuits 103–106, respectively, which develop the control signals which determine the amplification factors $\alpha_2$ of the anti-resonance and resonance circuits. The underlying priciple of the operation of the circuit of FIG. 10 is identical with that of the corresponding portions of the circuit of FIG. 1, and a detailed discussion thereof is therefore omitted. As mentioned above, by using the circuitry of FIG. 10 to develop signals to control the values of $\alpha_2$ with a feedback technique, the circuit also becomes "adaptive" with respect to the bandwidth requirements.

Figure 5:
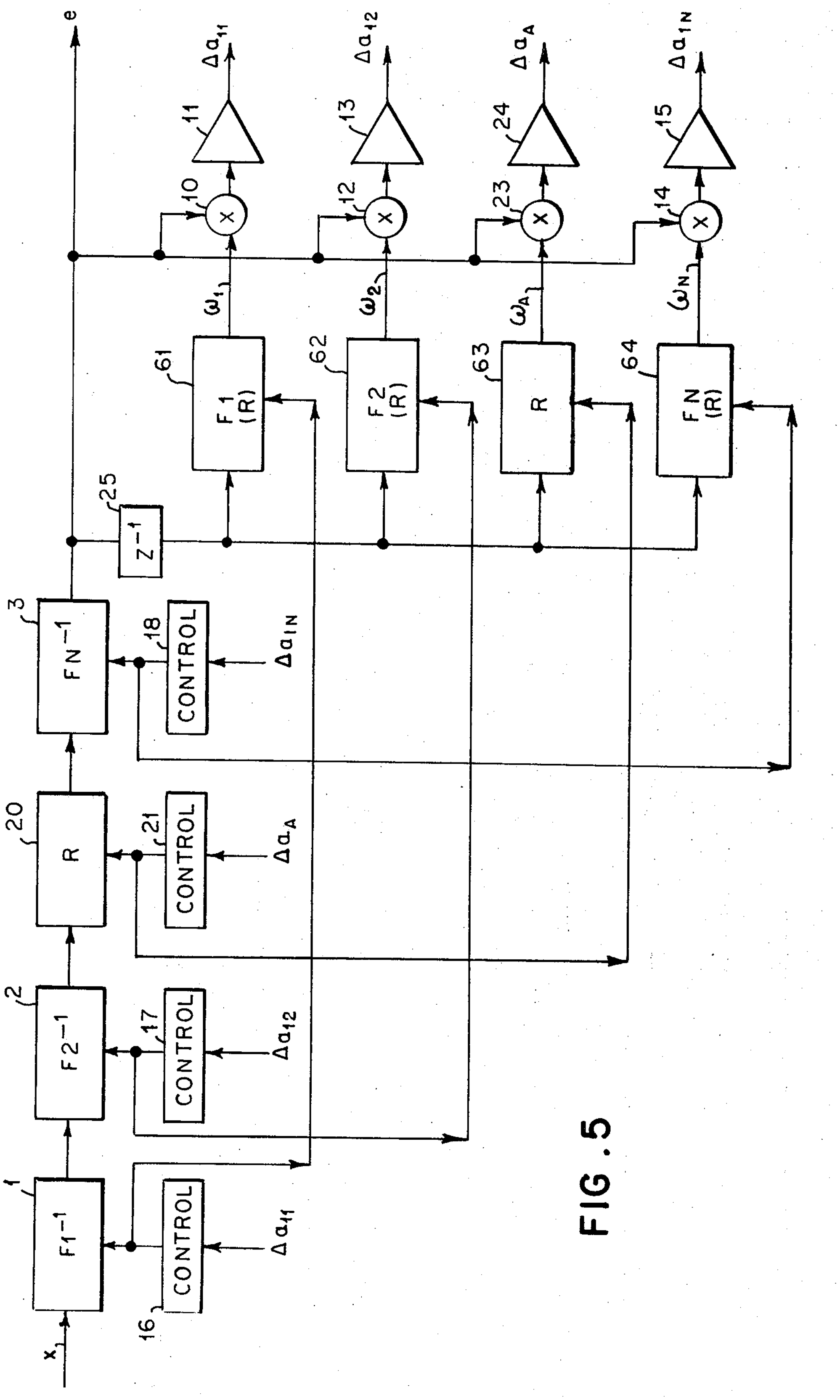
FIG. 5 is an alternate embodiment of the present invention.

FIG. 5 illustrates an alternate embodiment of the present invention for detecting poles and/or zeros (that is, resonances and/or anti-resonance, respectively) of an input signal. The elements in FIGS. 1 and 5 which are similar in construction and function are given the same reference numerals throughout. The embodiment of FIG. 5 utilizes similar concepts of that of FIG. 1, but the embodiment of FIG. 5 utilizes less circuitry. The input signal $x$ is fed to series connected anti-resonance circuits 1, 2, resonance circuit 20 and anti-resonance circuit 3, the output of anti-resonance circuit 3 being the output signal $e$. The signal e is fed through a delaying circuit 25, the output of which is coupled to the parallel combination of resonance circuits 61, 62, 63 and 64 the coefficients of which are respectively identical to those of circuits 1, 2, 20 and 3. The outputs $\omega_1$, $\omega_2$, $\omega_A$ and $\omega_N$ are respectively fed to multipliers 10, 12, 23 and 14 for cross-correlation with the output signal e to develop correction signals $\Delta a$'s. The correction control signal $\Delta a$'s are used to control the anti-resonance and resonance frequencies in the same manner as in FIG. 1. Again, the main concept of the embodiment of FIG. 5 is to determine the component parameters of the input signal which may be easily transmitted and reconstitute the original signal with accuracy.

FIG. 6 illustrates a resonance circuit for use with the present invention. The input signal to the resonance circuit is fed to a summing device 40, the output of which constitutes the output of the resonance circuit. The output of the summing device 40 is also connected to the series connected time delays 41 and 42. The output of time delay 41 is fed to variable amplification circuit 43 having a variable amplification factor $\alpha_1$. The output of time delay 42 is fed to variable amplification circuit 44 having a variable amplification factor $\alpha_2$. The outputs of amplifiers 43 and 44 are fed to the summing inputs of the summer 40. By varying the amplification factor of the amplifier 43, in the same manner as the amplification factors were varied in the anti-resonance circuits, the resonance frequency of the resonance circuit of FIG. 6 can be varied. Amplifier 44 controls the bandwidth of the resonator, and its amplification factor can be varied to change the bandwidth by fixed amounts or with FIG. 10.

With the present invention, voice information can be transmitted by transmitting the values of the signals $a_{11}$, $a_{12} \ldots a_{1N}$, and the value of the pitch period $T_p$ (see FIG. 1), and the signal representing voiced or unvoiced sounds. The information is sufficient to obtain a facsimile reproduction of the input voice signal. A typical synthesizer for generating a voice sound from this information is illustrated in FIG. 7. The pitch period ($T_p$) is fed to a pulse generator 50 which generates glottal type pulses. This represents voiced sounds. The output of the pulse generator 50 is fed to a switch 52 and then to an amplifier 51, the output of which is fed to the series connected formant resonators F1, F2 and F3, the resonant frequencies of which are set by signals corresponding to signals $a_{1i}$ in FIG. 1. In the case of voice signals, it is only necessary to reconstitute the three most prominent formant frequencies F1 – F3 to obtain satisfactory voice reproduction. If more formants are desired, then more formant resonators are provided. The output of the final generator F3 is fed to a D/A converter to convert the digital signals into analog voice signals which can be used to generate a desired sound.

A white noise generator 53 is also coupled to the switch 52, and is selectively fed to the amplifier 51 and then to the formant resonators F1 – F3. The white noise generator is used to reproduce unvoiced sounds. The information regarding voiced and unvoiced signals which is generated, for example, by the detector 73 of FIG. 9, is used to determine the position of the switching arrangement 52 of FIG. 7. For example, when the transmitted signal indicates that voiced signals are to be reproduced, then the switch 52 is in a position to couple the output of the pulse generator 50 to the formant resonators F1 – F3. When the signal is such that unvoiced sounds are to be reproduced, the switch 52 is in a position to couple the output of the white noise generator 53 to the formant resonators. As mentioned above, the pitch period information determines the spacing between the pulses generated by the pulse generator 50. Amplifier 51 is optionally provided, as required, to provide isolation and to bring the signals to the proper levels. Switch 52 is shown as a mechanical switch only by way of example for ease of explanation. In practice an electronic switch controlled by the voiced/unvoiced signal, would be used.

An alternative arrangement is to provide a detector arrangement similar to that of FIG. 9 at the receiving end, for example at the arrangement of FIG. 7, to determine voicing from the values of the pitch period $T_p$. when the values of the pitch period $T_p$ fall below a predetermined value, this is an indication that the received voice signal represents unvoiced sounds, and the switching arrangement 52 can then be switched to couple the white noise generator 53 directly to the formant resonators. Alternatively, when the detector at the receiver determines that the pitch period exceeds the predetermined value and is in the range of normal voiced speech sounds, then the switching arrangement 52 is caused to switch to the position to couple the pulse generator 50 to the formant resonators. This modified system is more efficient in that it is not necessary to transmit a voiced/unvoiced bit from the transmitting end. Thus, fewer transmitted bits are required to reproduce a signal, thereby reducing the bandwidth requirements of a transmission medium. The detector at the receiving end would generally be similar to detector 73 of FIG. 9.

While the above description has been given with respect to voice signals, it should be clear that the present invention is equally suitable to other systems requiring analysis of input signals. For example, in a system wherein it is desired to detect the resonant frequencies of a physical mass, for example, it is necessary to vibrate the mass and to sense the output signals therefrom. Using prior art techniques, the output signal is then spectrum analyzed to determine the resonant frequencies which may exist. With the present invention, white noise or pulse signals could be supplied to the vibrating system to set same in vibration. The apparatus of FIG. 1, omitting the resonance circuit 20 and its associated circuitry, could be used to analyze the signal representing the vibration of the physical mass. The correction signals developed from the branch circuits will cause the anti-resonance circuits to cancel out the resonant frequencies of the input signal to the system of FIG. 1. After the circuit has reached steady state the output signal will be similar to the signal e with the white noise or sharp spikes representing the input driving function to the vibrating system. That is, if the input driving function was a series of pulses, the output $e$ would be as shown in FIG. 1. If the input driving function was white noise, the output $e$ would be a white noise-type of signal. The values of the anti-resonance frequencies of the anti-resonance circuits will then represent the values of resonant frequencies of the vibrating mass. Thus, it is not necessary to conduct a complete spectrum analysis of the signal to determine resonant frequencies. The present invention achieves this desired end using a minimum amount of equipment and in a more simple and more accurate manner.

Similarly, with an electrocardiogram, it is desired to only detect the sharp spikes which represent the heartbeat. The resonant or anti-resonant responses in between the desired sharp pulses should be eliminated in order to make the reading more accurate and reliable. With the present invention, the anti-resonance circuits will automatically converge on the resonant or anti-resonant frequencies, and the output from the system will be a clean signal representing only the pulses which correspond to the heartbeats.

Figure 8:
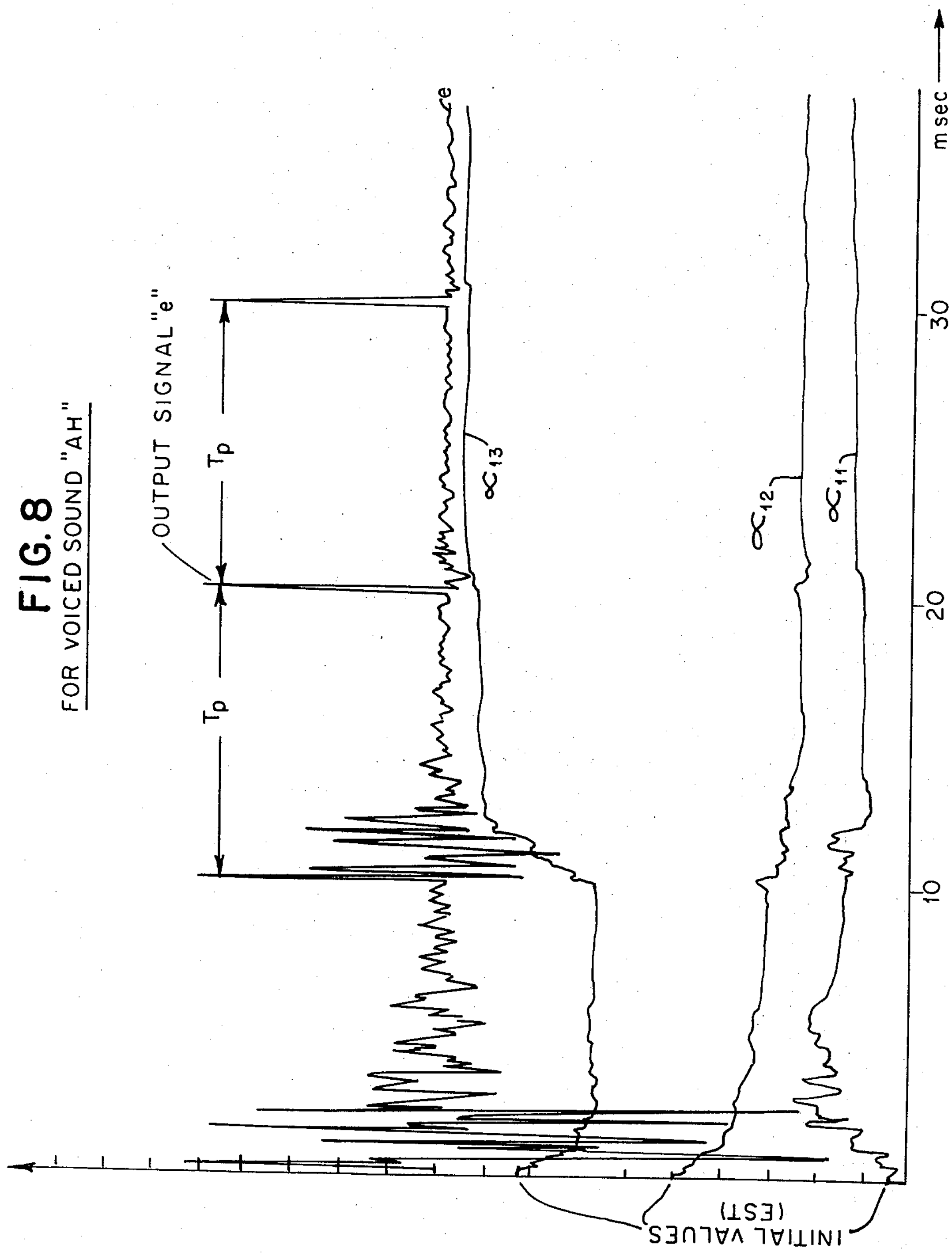
FIG. 8 is a graphical representation of the operation of the embodiment of FIG. 1 when used for voice analysis.

In a typical example using a simulated voice signal, and using three anti-resonance circuits for detecting the three major formant frequencies, the anti-resonance circuits quickly converged in only a few cycles of operation to approximately the desired values to provide the desired result. FIG. 8 is a graph illustrating the convergence of the control values (and therefore the anti-resonance frequencies) to the desired values to make the correction signals $\Delta a_{11} - \Delta a_{13}$ approach zero.

It should be clear that if it is desired to detect more resonant frequencies, then more anti-resonance circuits should be used. Likewise, if it is desired to detect more anti-resonant frequencies, then more resonance circuits should be used. The connections of the various additional circuits should be apparent from FIGS. 1 and 5.

While the invention has been described above with respect to specific circuit arrangements, it should be clear that the above description is given by way of example and that various modifications and alterations can be made within the scope of the appended claims.

We claim:

1. An adaptive filter apparatus for determining characteristics of an electrical input signal comprising:

a source of an input signal;

at least two primary anti-resonance circuits coupled to said input signal source;

means for developing indicator signals corresponding to respective resonant frequencies in said input signals;

means for cross-correlating the output from at least one of said anti-resonance circuits with said indicator signals and for generating correction signals as a function of said cross-correlation; and means responsive to said correction signals for varying the anti-resonant frequencies of said anti-resonance circuits such that the anti-resonant frequencies of said anti-resonance circuits correspond to respective resonant frequencies in said input signal, to thereby suppress and detect said respective resonant frequencies.

2. Apparatus according to claim 1 comprising at least the same number of primary anti-resonance circuits as the maximum number of resonant frequencies to be determined in said input signal.

3. Apparatus according to claim 1 wherein said primary anti-resonance circuits are connected in series with said input signal source.

4. Apparatus according to claim 3 wherein said developing means includes at least one secondary anti-resonance circuit connected in parallel with at least one of said primary anti-resonance circuits; and wherein said means responsive to said correction signals varies the anti-resonant frequency of said at least one secondary anti-resonance circuit in accordance with at least one of said primary anti-resonance circuits.

5. Apparatus according to claim 4 wherein said cross-correlating means cross-correlates the output of selected ones of said secondary anti-resonance circuits with the output of the last of said series connected primary anti-resonance circuits, and generates respective correction signals as a function of said cross-correlations.

6. Apparatus according to claim 5 wherein said cross-correlating means further cross-correlates the delayed input to the last of said series connected primary anti-resonance circuits with the output of said last primary anti-resonance circuit, and generates a corresponding correction signal.

7. Apparatus according to claim 5 wherein the correction signal corresponding to the cross-correlation of the output of said last series connected primary anti-resonance circuit with the output of said at least one secondary anti-resonance circuit is applied at least to the primary anti-resonance circuit preceding the primary anti-resonance circuit with which said at least one secondary anti-resonance circuit is connected in parallel.

8. Apparatus according to claim 6, wherein the correction signal corresponding to said further cross-correlation is applied at least to the last of said series connected primary anti-resonance circuits and to at least one of said secondary anti-resonance circuits.

9. Apparatus according to claim 1 including at least one primary resonance circuit coupled to said input signal source and wherein said developing means includes means for developing an indicator signal corresponding to a given anti-resonant frequency in said input signals; and said means responsive to said correction signals varies the resonant frequency of said resonance circuit, as a function of said anti-resonant frequency indicator signal, to correspond with said given anti-resonant frequency in said input signal.

10. Apparatus according to claim 3, wherein said developing means includes at least two secondary resonance circuits connected in parallel with each other and connected to the output of the last of said series connected primary anti-resonance circuits, each of said secondary resonance circuits being associated with a respective one of said primary anti-resonance circuits; and wherein said means responsive to said correction signals varies the anti-resonant and resonant frequencies of said associated anti-resonance and resonance circuits in a like manner so that the anti-resonant and resonant frequencies of said associated anti-resonance and resonance circuits are the same.

11. Apparatus according to claim 4 wherein said developing means includes at least one delaying circuit connected in each parallel path of said secondary anti-resonance circuits.

12. Apparatus according to claim 1 wherein said means responsive to said correction signals includes memory means storing a predetermined number of information items and responsive to said correction signals for generating a corresponding information item, said corresponding information item being coupled to an anti-resonance circuit to vary the anti-resonant frequency thereof.

13. Apparatus according to claim 9 wherein said means responsive to said correction signals includes memory means storing a predetermined number of information items and responsive to said corresponding information item, said corresponding information item being coupled to a resonance circuit to vary the resonant frequency thereof.

14. Apparatus according to claim 1 including means for varying the bandwidths of said anti-resonance circuits.

15. Apparatus according to claim 14 wherein said bandwidth varying means varies said bandwidths in response to said indicator signals.

16. Apparatus according to claim 14 wherein said bandwidth varying means varies said bandwidths in response to the output from said primary anti-resonance circuits.

17. Apparatus according to claim 14 wherein the bandwidths of said anti-resonance circuits are variable between two pre-determined values, and including means responsive to the output from said apparatus for varying said bandwidths between said two values.

18. Apparatus according to claim 9 including means for varying the bandwidth of said at least one primary resonance circuit.

19. Apparatus according to claim 10 including means for varying the bandwidths of said primary and secondary resonance circuits.

20. Apparatus according to claim 4 including means for varying the bandwidths of said primary and secondary anti-resonance circuits.

21. Apparatus according to claim 14 wherein said bandwidth varying means includes delay means for delaying said indicator signal; second cross-correlating means for cross-correlating the output from at least one of said anti-resonance circuits with said delayed indicator signals and for generating second correction signals as a function of said second cross-correlation; and means responsive to said second correction signals for varying the bandwidths of said anti-resonance circuits to correspond with the bandwidth of the input signal.

22. Apparatus according to claim 21 further comprising at least one primary resonance circuit coupled to said input signal source, and wherein said bandwidth varying means includes means for varying the bandwidth of said resonant circuit.

23. Apparatus according to claim 1 wherein said input signal is a voice signal, said apparatus further comprising means for detecting the pitch period of said voice signal, said pitch period detecting means comprising counter means coupled to the output from said at least one anti-resonance circuit and for generating a signal which is a function of the time period between successive pulses, thereby indicating the pitch period of the voice input signal.

24. Apparatus according to claim 23 further comprising detector means to detect when the output from said counter falls below a predetermined value, and for varying the bandwidth of said anti-resonance circuits in response to said detection.

25. An adaptive filter apparatus for determining characteristics of an electrical input signal comprising:

- a source of an input signal;
- at least one primary resonance circuit coupled to said input signal source;
- means for developing indicator signals corresponding to respective anti-resonant frequencies in said input signals;
- means for cross-correlating the output from at least one of said resonance circuits with said indicator signals and for generating correction signals as a function of said cross-correlation; and
- means responsive to said correction signals for varying the resonant frequencies of said resonance circuits corresponding to respective anti-resonant frequencies in said input signal to thereby suppress and detect said respective anti-resonant frequencies.

26. Apparatus according to claim 25 comprising at least the same number of primary resonance circuits as the maximum number of anti-resonant frequencies to be determined in said input signal.

27. Apparatus according to claim 25 wherein said primary resonance circuits are connected in series with said input signal source.

28. Apparatus according to claim 27 wherein said developing means includes at least one secondary resonance circuit connected to the output of at least one of said primary resonance circuits; and wherein said means responsive to said correction signals varies the resonant frequency of said at least one secondary resonance circuit in accordance with the output of at least one of said primary resonance circuits.

29. Apparatus according to claim 27 wherein said cross-correlating means cross-correlates the output of respective ones of said secondary resonance circuits with the output of the last of said series connected primary resonance circuits, and generates respective correction signals as a function of said cross-correlations.

30. Apparatus according to claim 27 including a plurality of secondary resonance circuits connected in parallel, the parallel combination being coupled to the output of the last of said series connected primary resonance circuits, the number of primary and secondary resonance circuits being equal.

31. Apparatus according to claim 25 including at least one primary anti-resonance circuit coupled to said input signal source and wherein said developing means includes means for developing an indicator signal corresponding to a given resonant frequency in said input signals; and said means responsive to said correction signals varies the anti-resonant frequency of said anti-resonance circuit, as a function of said resonant frequency indicator signal, to correspond with said given resonant frequency in said input signal.

32. Apparatus according to claim 30 wherein said developing means includes at least one delaying circuit connected in each parallel path of said secondary anti-resonance circuits.

33. Apparatus according to claim 25 wherein said means responsive to said correction signals includes memory means storing a predetermined number of information items and being responsive to said correction signals for generating a corresponding information item, said corresponding information item being coupled to a resonance circuit to vary the resonant frequency thereof.

34. Apparatus according to claim 25 including means for varying the bandwidths of said resonance circuits.

35. Apparatus according to claim 34 wherein said bandwidth varying means varies said bandwidths in response to said indicator signals.

36. Apparatus according to claim 34 wherein said bandwidth varying means varies said bandwidths in response to the outputs from said primary resonance circuits.

* * * * *